US006897640B2

United States Patent
Nebon et al.

(10) Patent No.: US 6,897,640 B2
(45) Date of Patent: May 24, 2005

(54) SWITCHED MODE POWER SUPPLY DEVICE ADAPTED FOR LOW CURRENT DRAINS, AND CELLULAR PHONE EQUIPPED WITH SUCH A DEVICE

(75) Inventors: Jerome Nebon, Grenoble (FR); Alexandre Balmefrezol, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 10/237,164

(22) Filed: Sep. 6, 2002

(65) Prior Publication Data

US 2003/0122531 A1 Jul. 3, 2003

(30) Foreign Application Priority Data

Sep. 7, 2001 (FR) .............................. 01 11568

(51) Int. Cl.[7] ................................. G05F 1/44
(52) U.S. Cl. ...................... 323/282; 323/284; 323/288
(58) Field of Search ................. 323/282, 283, 323/284, 288

(56) References Cited

U.S. PATENT DOCUMENTS

| 4,302,802 A | 11/1981 | Hyde et al. .................. 363/21 |
| 5,731,694 A | 3/1998 | Wilcox et al. .............. 323/287 |
| 6,218,817 B1 * | 4/2001 | Chang ........................ 323/283 |
| 6,285,174 B1 * | 9/2001 | Suzuki ....................... 323/288 |
| 6,396,250 B1 * | 5/2002 | Bridge ....................... 323/283 |

FOREIGN PATENT DOCUMENTS

EP 0 338 834 A2 10/1989

* cited by examiner

Primary Examiner—Gary L. Laxton
(74) Attorney, Agent, or Firm—Lisa K. Jorgenson; Robert Iannucci; Seed IP Law Group PLLC (57) ABSTRACT

A switched mode power supply device comprising a power transistor periodically set to conduction and supplying a regulated voltage that comprises a ramp generation circuit controlled by a clock signal and periodically generating a ramp voltage. The device includes an amplifier error circuit between a reference voltage and said regulated output voltage and generates an error signal, and a comparator comparing the ramp voltage with said error voltage and providing an output signal for controlling said power circuit. The circuit is characterized in that it comprises a delay element delaying the setting to conduction of the power transistor so as to desynchronize the starting of the ramp and said setting to conduction.

22 Claims, 7 Drawing Sheets

SWITCHED MODE POWER SUPPLY DEVICE ADAPTED FOR LOW CURRENT DRAINS, AND CELLULAR PHONE EQUIPPED WITH SUCH A DEVICE

BACKGROUND OF THE INVENTION

1. Field of the Invention

The present invention relates to power feeding circuits, and more particularly, to a switched mode power supply device adapted for low current drain.

2. Description of the Related Art

Portable electronic circuits develop and spread. They are powered by batteries, which supply them with the energy necessary to their operation. The designing of these batteries is also constantly developing.

The field of mobile telephony particularly illustrates the development of mobile electronics powered by electric batteries. In spite of their miniaturization, cellular phones meeting the Global Mobile Service standard require an important ringing current in operating mode. On the contrary, in suspend mode cellular phones drain very low current and engineers developing these apparatuses are constantly trying to further reduce current drains.

When considering the particular mobile telephony sector of embarked electronics, it can be noted that the size and weight of the batteries fitted in these apparatuses are constantly decreasing in spite of the large currents—several hundreds milliamperes—that they have to supply at full load. The search for large outputs—in general greater than 90%—then leads to choosing a switched mode power supply circuit. Indeed, considering a given technology—for example a Very Large Scale Integrated (V.LS.I.) technology for semiconductor circuits etched with an accuracy of 0.13 $\mu$m for example, it is noted that nominal voltages for operation—0.9 volt or 1.2 Volts—are much lower than the nominal voltage supplied by a Ion-lithium battery, for example. This voltage is not constant since it tends to vary according to the loading state of the battery and the amount of components prompting said battery at a given moment.

Thus, it is necessary to use a regulated power supply device with a high efficiency if possible, so a designer of a power supply system will naturally turn towards using a Switched Mode Power Supply, which is the only system allowing a high efficiency.

While switched mode power supplies operate satisfactorily at full load, they do not operate in a very satisfactory way for very low loads, which is the case for a cellular phone in suspend mode for example.

Figure 1:
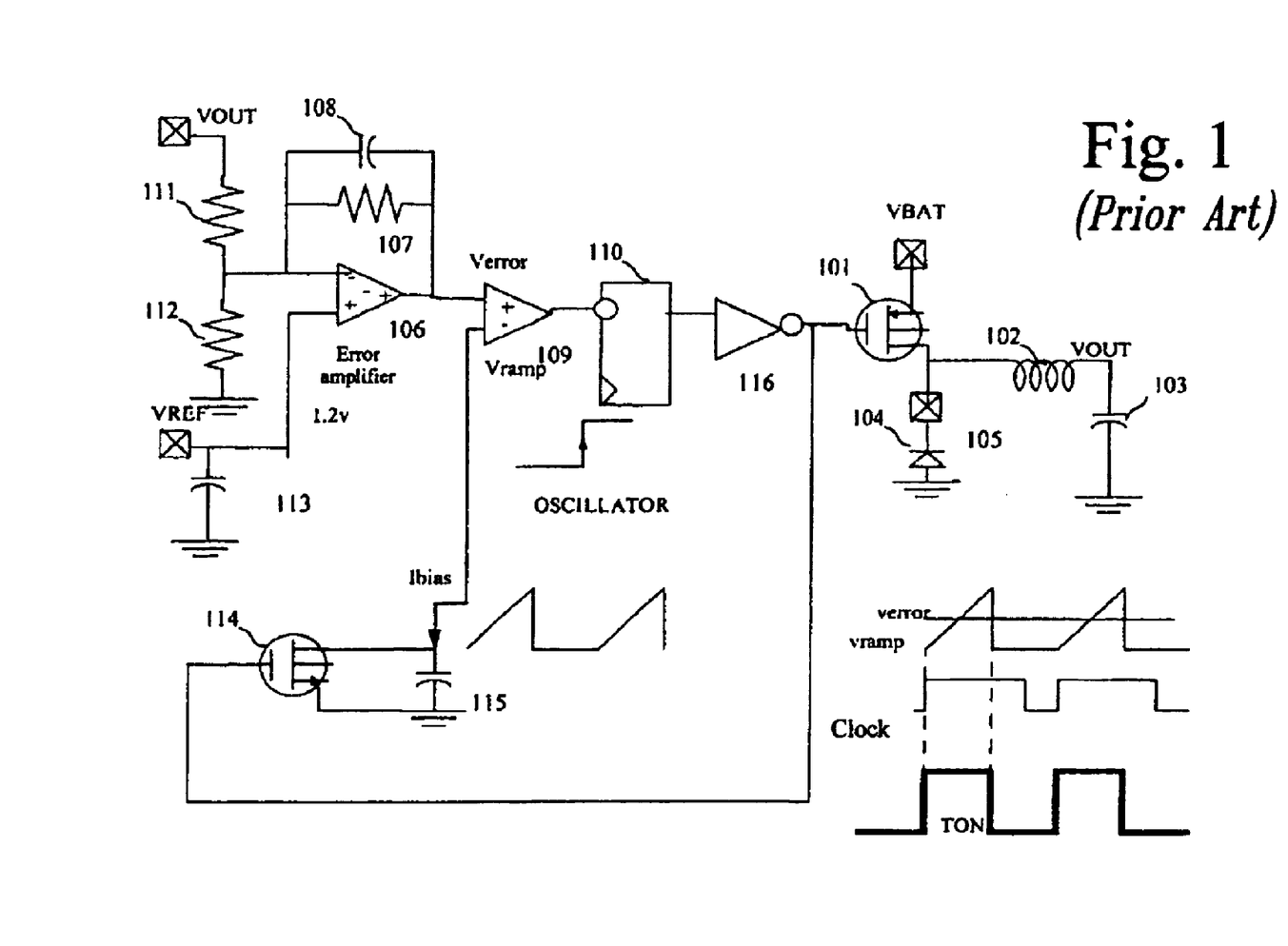
FIG. 1 illustrates a flowchart of a switched mode power supply based on a comparator and a ramp generation circuit.

FIG. 1 is an illustration of a traditional architecture for a switched mode power supply device, for example for a cellular phone. Typically, a power circuit is comprised of a PMOS transistor 101, associated with a recovery diode 104, and this assembly supplies current to a load (not represented) via a quadripole L-C including an inductive resistor or choke 102 and a capacitor 103. The power circuit is controlled by a control circuit based on a comparator 109 and a ramp generator—comprised of a transistor 114 and a capacitor 115 loaded by a current $I_{bias}$. An amplifier circuit, comprised of an operational amplifier (op amp) 106 associated with a feedback circuit, comprising a resistor 107 and a capacitor 108 assembled in parallel, amplifies the error between the output voltage to be regulated $V_{out}$ and a reference voltage $V_{ref}$. The output of the amplifier is sent to one of two inputs of the comparator, the second input of the comparator receives the ramp voltage. Thus periodically, at the frequency of a clock signal, the comparator generates a cyclic signal, the cyclic ratio of this signal depends on the variation between the voltage $V_{out}$ and the reference voltage $V_{ref}$. Thus, the opening cyclic ratio of power transistor 110 is controlled so that the output voltage $V_{out}$ gets closer to the desired value $V_{ref}$.

More particularly, on each clock pulse, the MOS transistor 101, supplying the charging current, starts to conduct and the ramp signal generation starts. When the ramp voltage output from the error amplifier reaches the error voltage value, the error amplifier switches and locks the MOS transistor control. Considering that the voltage $V_{out}$ drops below reference the value Vref, it should be noted that the error signal tends to rise, causing the cyclic ratio to increase—and in particular factor $T_{on}$ corresponding to the setting to conduction of the power transistor 101.

Thus, the voltage Vref allows to adjust the desired value for voltage $V_{out}$, and it is observed that this output voltage is regulated through the opening period control—Ton—of the feeding transistor.

Although this type of switched mode power supply is really useful in mobile telephony, there still is a problem for very low loads. Indeed, when a phone is in suspend mode and when power drain is particularly low, the error voltage Verr is very low in turn. It is necessary to generate particularly small values for the cyclic ratio and in particular for Ton, but the intrinsic switching times of the toggling circuit and especially the delays of the comparator 109 set limitations.

To reduce the Ton value, a faster comparator allowing to reduce intrinsic switching delays is traditionally used, but this leads to an increased power drain, thereby reducing the value of Ton. Another known way of avoiding the loss of efficiency resulting from the use of a faster comparator consists in acting on the relative value of the cyclic ratio Ton/T by reducing the operational frequency of the switched mode power supply so as to enter a pulse skipping operation mode. Reducing the operational frequency from 1 Mhz to 50 kHz, for example, allows to reduce the cyclic ratio twenty times without having to use a faster comparator. But this means approaching the audio frequency range, which disturbs the operation of the RF part that ensures radio frequency transmission of the phone. Thus it is necessary to prevent switched mode power supplies from operating in pulse skipping mode when the phone is in operating mode, i.e., when RF and audio parts of the circuit are enabled. It is noted that even when these elements are active, the current used can be particularly low.

The desire to use a switched mode power supply—which has the advantages mentioned above in terms of efficiency—for example for a cellular phone, in the whole current range including for lower values, creates the following dilemma: either operation in pulse skipping mode degrades the audio performances of the phone or the increase of the switching speed of the comparator causes the feeding circuit to be less efficient.

Such limitations cripple the development of new cellular phone technologies.

Thus it is desirable to be provided with a switched mode power supply circuit that operates satisfactorily for high loads as well as for very low loads while not disturbing the audio operation of the apparatus and in particular cellular phones.

BRIEF SUMMARY OF THE INVENTION

Embodiments of the present invention provide a highly efficient switched mode power supply structure that allows operation at a constant frequency even when power drain is low.

A simple switched mode power supply device is provided that is particularly adapted to the technology of the new generation of mobile phones.

Embodiments of the invention involve a switched mode power supply comprised of a feeding transistor conducting periodically and supplying a regulated output voltage (Vout) which comprises a ramp generation circuit controlled by a clock signal $C_{LK}$ and periodically providing a ramp voltage;

an error amplifier circuit between a reference voltage and said regulated output voltage and providing an error signal;

a comparator comparing the ramp voltage with said error voltage and providing an output signal used to control said power circuit.

The circuit has a delay element delaying the setting to conduction of the power transistor so as to desynchronize the starting of the ramp and the setting to conduction of said feeding transistor.

Thus the intrinsic delay of the comparator is compensated for and operation for very low current drains is then allowed. The comparator may even be associated with a power switch-off circuitry activated upon completion of the comparison between the error voltage and the ramp voltage, in order to further reduce current consumption.

Preferably, the comparator output is connected to a toggling circuit—of D-type for example—and said comparator is disabled upon completion of the comparison so as to further reduce power consumption.

In an exemplary embodiment, the delay circuitry comprises first and second toggling circuits having an input D receiving a reference potential. A clock signal periodically controls sampling of both toggling circuits, and resetting thereof is controlled by the comparator output. The output of the first toggling circuit is transmitted to a first input of an AND gate via a delay line, the AND gate has a second input connected to the output of the second D toggling circuit. The AND gate supplies a control signal to the power transistor. The existence of the delay line ensures that the output of the AND gate is switched with a delay compared to the switching of the second toggling circuit, which is used to control the resetting of the ramp generation circuit.

The power transistor is ensured to be set to conduction with a delay whereas it is immediately switched-off upon switching of the second toggling circuit.

The delay of the delaying circuitry will be set to the value of the combined delay of the comparator and toggling circuit so as to reduce the usable cyclic ratio to a desired value.

DETAILED DESCRIPTION OF THE INVENTION

Figure 2:
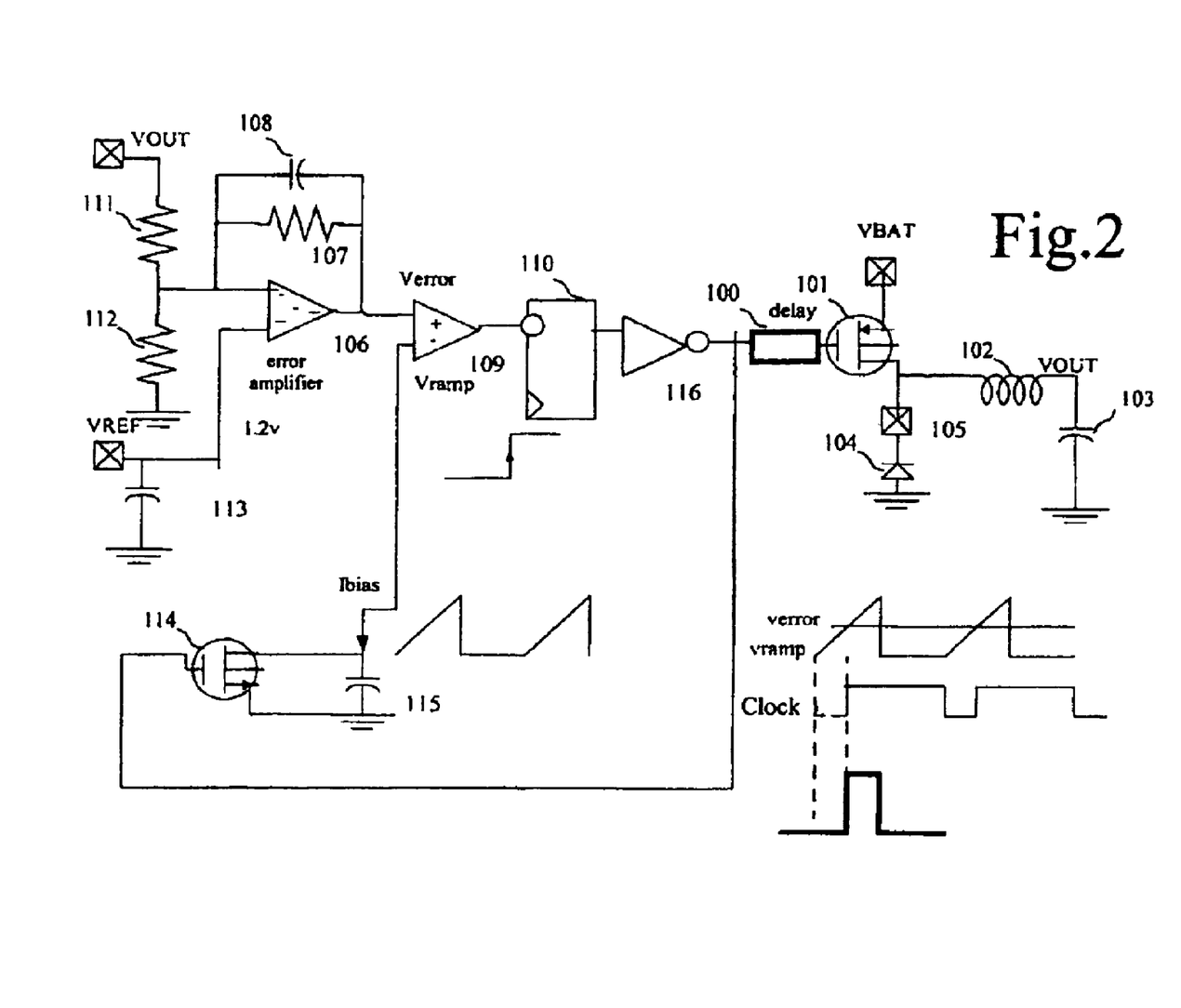
FIG. 2 shows a switched mode power supply modified so as to allow use of the lowest values of the cyclic ratio.

A preferred embodiment of a switched mode power supply circuit will now be thoroughly described with reference to FIG. 2. For clarity purposes, in FIG. 2 same elements as in FIG. 1 keep same reference numbers.

As will be seen, the circuit is particularly adapted for designing a feeding circuit for a new generation cellular phone. A modern cellular phone generally comprises a digital signal processing (D.S.P.) unit which consumes a lot of current in active mode and which is associated with a microcontroller for managing keyboard, screen, user interface etc., . . . which requires much less power. Thus, in suspend mode, the phone can operate with very low feeding current whereas in active operating mode—when the user is using his/her phone—the D.S.P unit features are fully used in the apparatus, thus substantially increasing the current consumed by the phone. Thus the switched mode power supply circuit is particularly adapted to power supplies for cellular phones that operate in these two quite different operating modes, because it allows operation even with very low cyclic ratio values. It is however clear that people qualified in the art will be able to adapt teachings of this invention to any other mobile electronic device.

A circuit comprising a PMOS-type power transistor will also be described, it being understood that people qualified in the art could readily adapt the circuit to a reverse polarity power transistor. Thus, FIG. 2 shows a PMOS transistor 101 with a source connected to a non-regulated voltage source, which is in general supplied by a battery, for example an Ion-lithium-type battery. As is known, the nominal voltages of this type of battery are of several volts and it is appropriate to reduce the output voltage to prescribed values that are compatible with the semiconductor technology used, for example between 0.9 and 1.2 volts. The PMOS transistor drain is connected to ground via a recovery diode 105 and is also connected to a first choke electrode 102 in serial connection with a capacitor 103. The regulated output voltage Vout is delivered on terminals of the capacitor 103 and can be used as supply voltage for a given load (not represented).

The control device of the PMOS transistor 101 will now be more particularly described. This control device comprises an operational amplifier (op. amp.) 106, the positive input of the op amp receives a reference voltage filtered by a capacitor 113. Op amp 106 is assembled as a linear amplifier with a feedback loop, which is comprised of a resistor 107 and a capacitor 108 which are assembled in parallel and this assembly allows to generate an error signal representative of a difference between the regulated voltage Vout and the reference voltage Vref. The error signal output from OP AMP 106 is transmitted to a positive input of a second OP AMP 109, assembled as a comparator circuit, and the negative input of op amp 109 receives a ramp voltage generated by a ramp generation circuit based on a transistor 114 associated with a capacitor 115. The output of OP AMP 109 is transmitted via a toggling circuit 110 (for example a D-type toggling circuit) and a reversing switch 116 to a grid input to the PMOS power transistor 101, via a delay element 100.

Delay element 100 is designed so as to introduce a predetermined delay on falling edges of the grid signal of PMOS transistor 101, i.e., a delay at the setting to conduction. For the system to operate in a satisfactory way, i.e., compensating for the delays inherent to the comparator 109 or toggling circuit 110, the delay element 100 must introduce a delay on switch-on but not on switch-off. This element can be implemented in a simple way as will be seen hereafter in the description of the preferred embodiment of FIG. 3. Introducing a delay to the setting to conduction of power transistor 101, allows to introduce a local desynchronization by making generation of the ramp start before the power transistor 101 is set to conduction, whereby all switching delays in the chain can be compensated for. This is simple to realize by directly connecting the output of the reversing switch 116 to the grid input of transistor 114 thus resetting the ramp generation circuit. On the other hand, transistor 101—the grid of which is connected to the output of the delay element—is set to conduction only after the preset delay time has elapsed. As can thus be seen, as illustrated by the timing diagrams in FIG. 2, the width of pulse Ton can be reduced by the delay value.

In order to reach particularly small values of the cyclic ratio, without using a fast comparator circuit, it is advantageous to use capacitor pairing techniques and current mirroring techniques that are well-known to people qualified in the art, which will allow to precisely adjust the delay of element 100 so that the switched mode power supply operates within a broad range of output currents, and in particular for the lowest values.

A substantial advantage results. In addition to allowing the switched mode power supply circuit to operate at very small values of the cyclic ratio Ton/T, the comparator 109 can also be switched off upon completion of the comparison. This further reduces the overall consumption of the circuit, which result could not be obtained with other techniques, in particular the technique based on using of a dual rising-falling ramp and switching the comparator twice per clock cycle.

Figure 3:
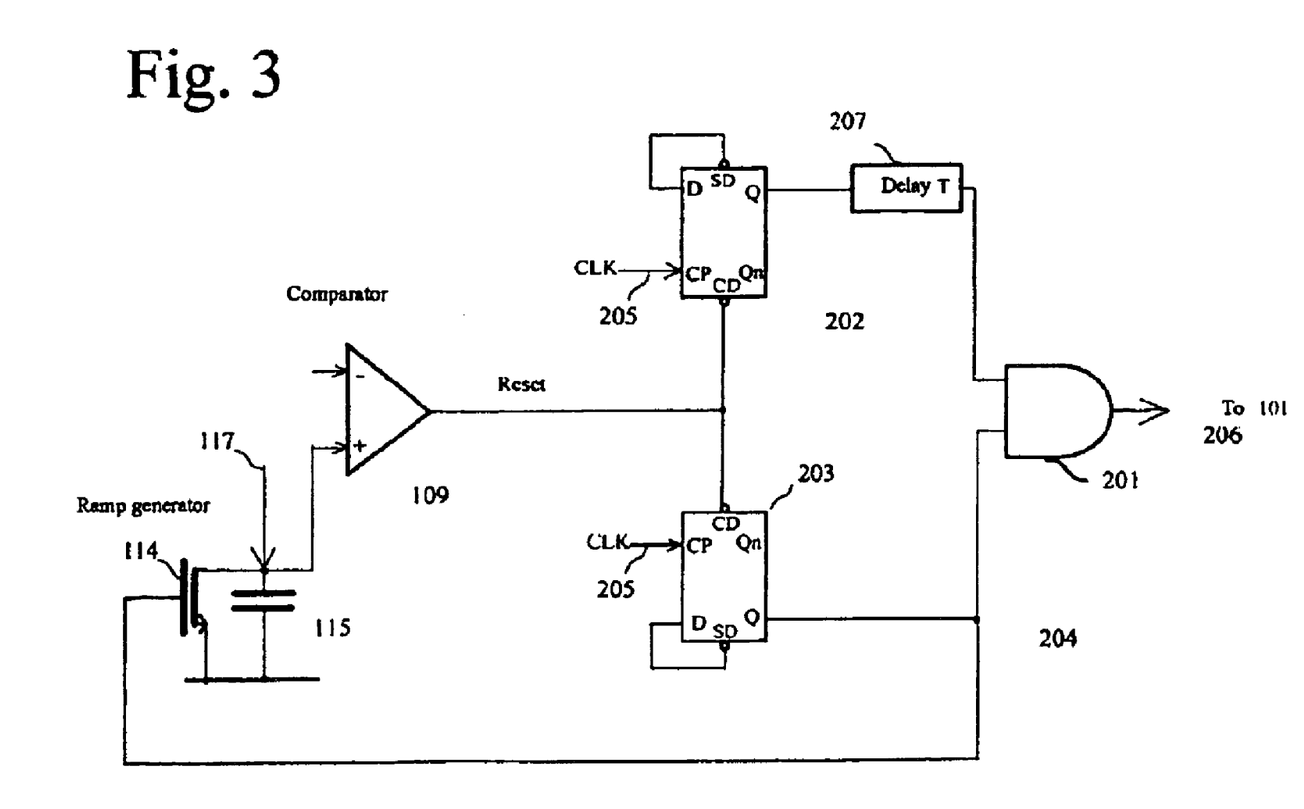
FIG. 3 illustrates a preferred embodiment of a switched mode power supply, comprising two toggling circuits D for desynchronizing the control of the ramp generation circuit and the setting to conduction of the power transistor.

FIG. 3 shows a preferred embodiment of a desynchronization circuit comprising a first toggling circuit 202 and a second toggling circuit 203. Both toggling circuits 202 and 203 have an input D and an input SD that are connected to a positive supply voltage. An input CP receives a clock signal CLK 205 allowing to clock the ramp generation, the representative timing diagrams of which are illustrated in FIG. 6b. Toggling circuits 202 and 203 are reset by means of a signal received by input CD, which is connected to the output of comparator 109.

The first toggling circuit 202 has an output Q that is connected to an input of a delay element 297, the output delay element 297 is connected to a first input of an AND gate 201.

The second toggling circuit 203 has an output Q that is connected to a second input of the AND gate 201, but is also used as a the ramp generator control circuit 204 comprising a transistor 114, a capacitor 115 and a power source 117. With an aim to illustrate the great variety of all possible ways the invention can be implemented, this time, the ramp generation circuit output is connected to the circuit comparator 109 positive input, contrary to what is illustrated in FIG. 2.

The output of the comparator is then connected directly to two CD inputs of toggling circuits 202 and 203 and is thus used to reset both toggling circuits.

The AND gate 201 provides an output voltage 206 for controlling the setting to conduction of the MOS power transistor 101, illustrated in FIG. 1. If needed, an adequate buffer-type circuit (not represented) may be added.

The desynchronization circuit operates as follows. The power transistor is supposed to be non-conducting. On the rising edge of the clock signal CLK, present on electrode 205, the output Q of both toggling circuits goes to a high state. This high state is immediately transmitted to the AND gate second input and also controls enabling of the ramp generator via circuit 204. However, it is only when the high state is transmitted to the first input of AND gate 201 by the delay element 207 that the output of AND gate 201 switches, whereby setting the MOS power transistor to conduction.

There is indeed an offset between the setting to conduction of this transistor and the enabling of the ramp generator, which is controlled as soon as both toggling devices switch.

Examining now how the same transistor is set not to conduct, it can be noted that as soon as the ramp voltage reaches the value of the error voltage at the comparator input, the comparator switches, thus causing both toggling circuits 202 and 203 to reset. Instantaneously, both toggling circuits change states, and the low state of output Q 204 of the second toggling circuit then immediately locks the AND gate 201, causing the MOS transistor 101 to immediately switch off.

Thus it can be observed that there is indeed a delay—from element 207—for setting the power transistor to conduction, but switching it off is instantaneous. This effect is obtained by the ramp generation circuit being controlled by the second toggling circuit output, while the first toggling circuit output is only transmitted to the input of AND gate 201 after a time delay.

Thus the intrinsic delay of the comparator is compensated for, as well as all delays in the switching chain, and the switched mode power supply can thus operate for very low current drain values, while avoiding pulse skipping mode.

FIGS. 4a–4e and 5a–5d illustrate timing diagrams of a simulation of various voltages existing in the feeding circuit when the resetting of the ramp generation circuit and the setting to conduction of the power transistor are synchronous.

Figure 4A:
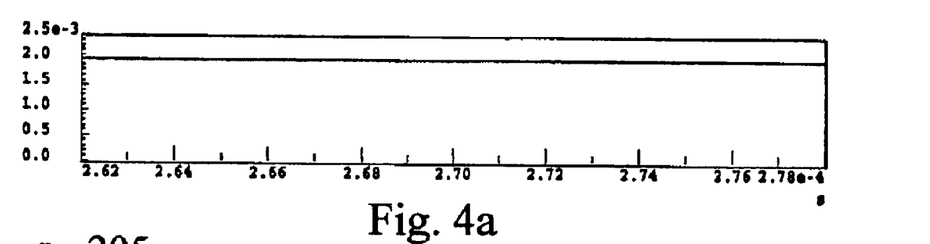
FIGS. 4a to 4e illustrate circuit operation in the absence of any desynchronization.

More particularly, FIG. 4a illustrates the shape of the charging current.

Figure 4B:
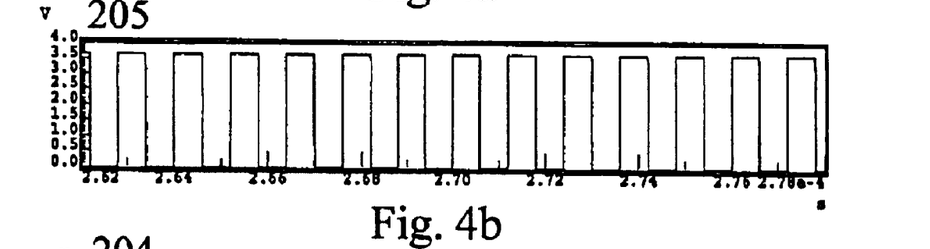

FIG. 4b illustrates the clock signal 205.

Figure 4C:
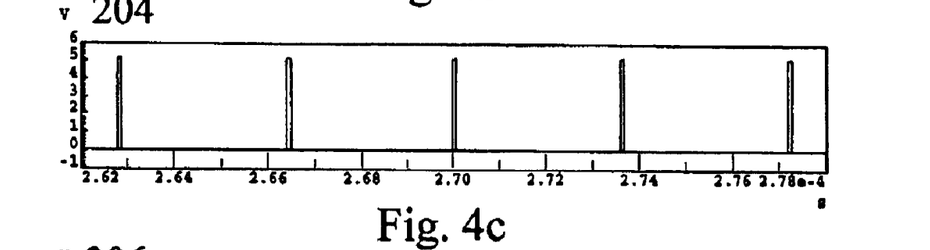

FIG. 4c shows the output signal Q of the second toggling circuit, which controls resetting of the ramp generator circuit.

Figure 4D:
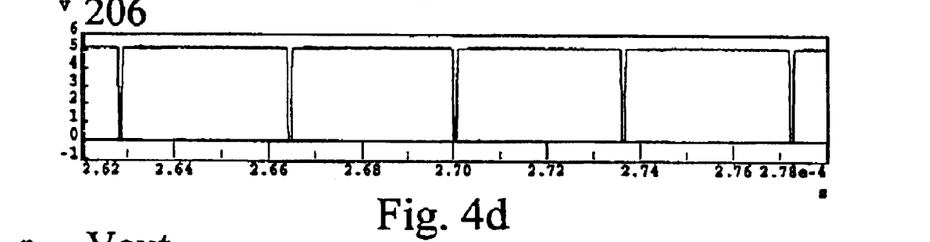

FIG. 4d illustrates the output voltage 206 of the AND gate 201, which is used to control the setting to conduction of power transistor 101.

Figure 4E:
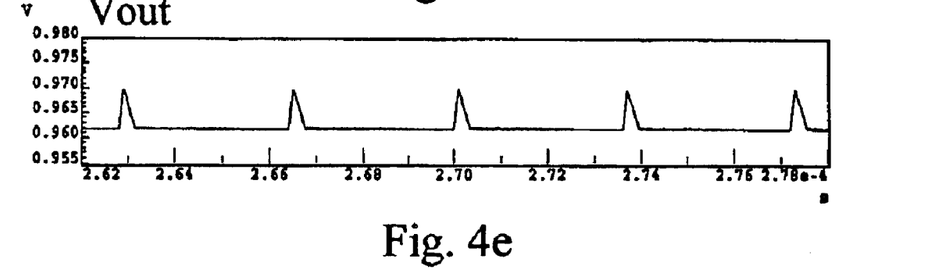

FIG. 4e shows voltage Vout on the terminals of the load.

Figure 5A:
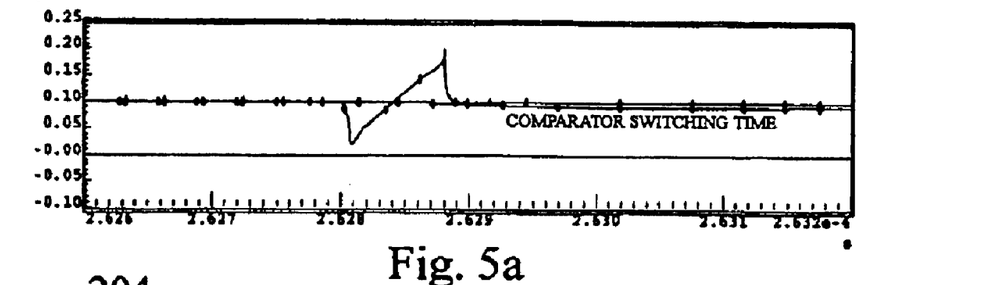
FIGS. 5a to 5d illustrate details of the timing diagrams in FIGS. 4a to 4e.

FIG. 5a illustrates the input signal of comparator 109 in detail.

Figure 5B:
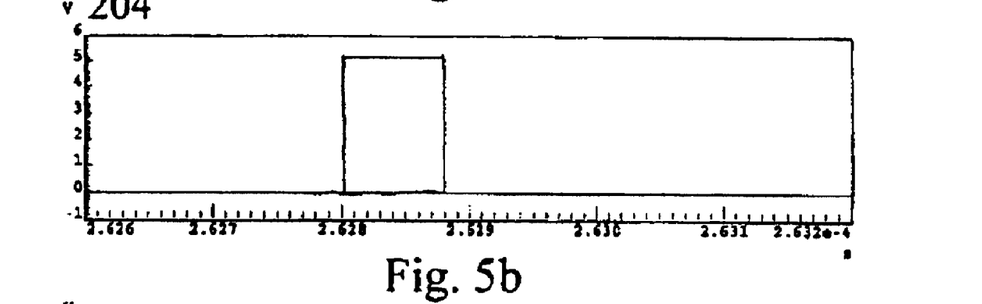

FIG. 5b illustrates the output signal Q 204 of the second toggling circuit in detail, which controls the resetting of the ramp generator circuit.

Figure 5C:
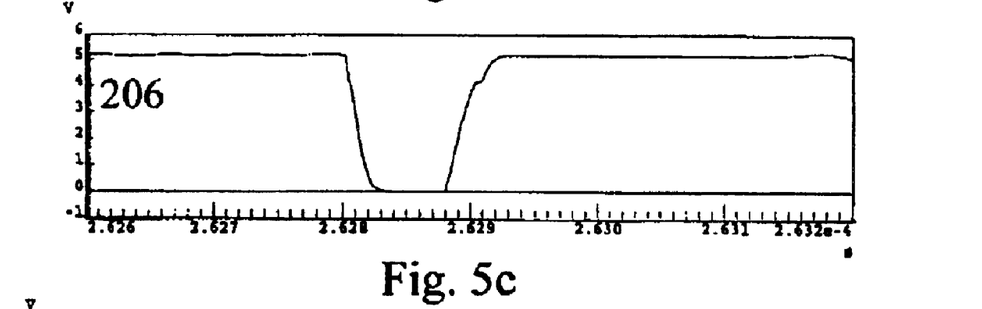

FIG. 5c illustrates in detail the output voltage 206 of AND gate 201, which is used to control the setting to conduction of power transistor 101.

Figure 5D:
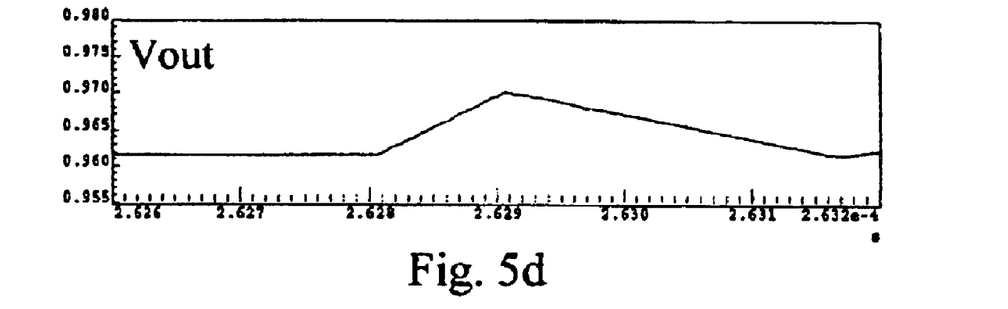

FIG. 5d shows details of voltage Vout on the terminals of the load.

FIGS. 6a–6e and 7a–d illustrate timing diagrams representative of the same voltages when the beginning of the ramp and the setting to conduction of power transistor 101 are desynchronized.

Figure 6A:
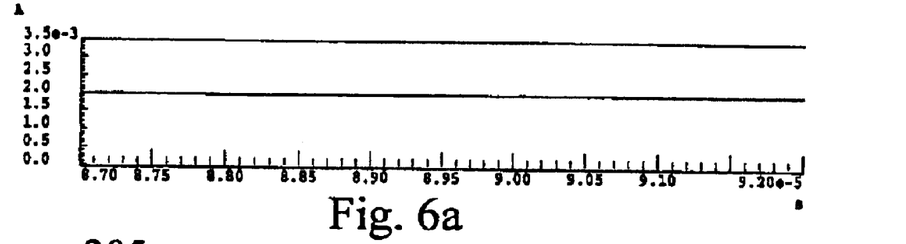
FIGS. 6a to 6e illustrate operation of the circuit when the setting to conduction of the power transistor is desynchronized compared to the start of the ramp generation.
Figure 6B:
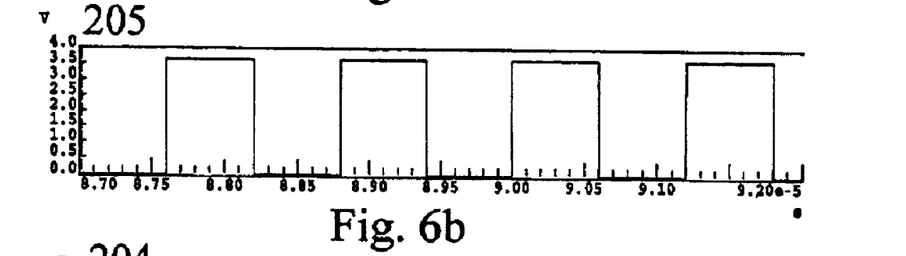

More particularly, FIG. 6a illustrates the shape of the charging current.

FIG. 6b illustrates the clock signal 205.

Figure 6C:
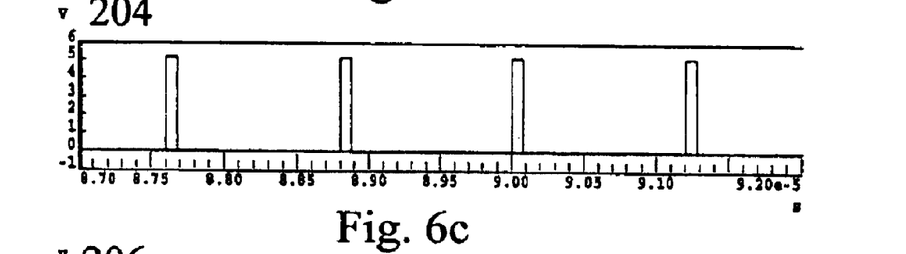

The FIG. 6c shows the output signal Q of the second toggling circuit 203, which controls the resetting of the ramp generator circuit.

Figure 6D:
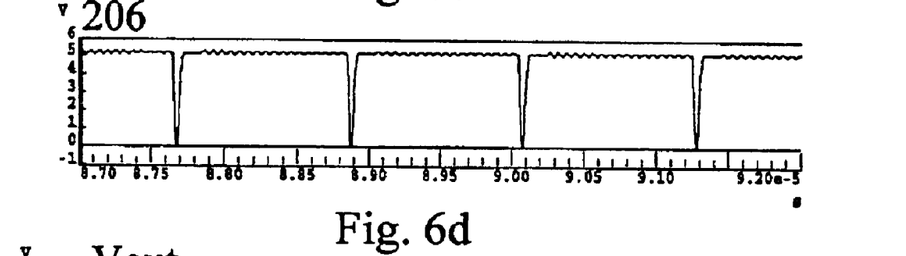

The FIG. 6d illustrates the output voltage 206 of the AND gate 201, which is used to control the setting to conduction of the power transistor 101.

Figure 6E:
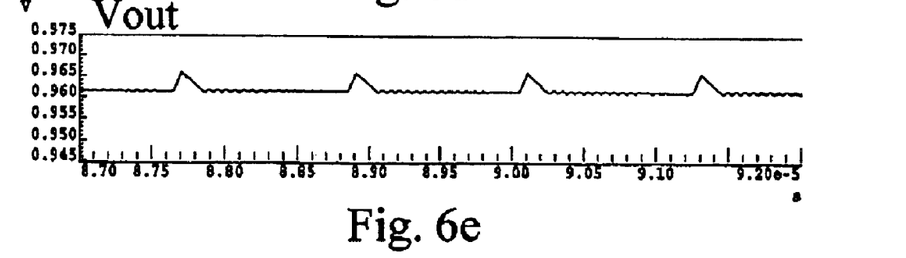

FIG. 6e shows the voltage Vout on terminals of the load.

Figure 7A:
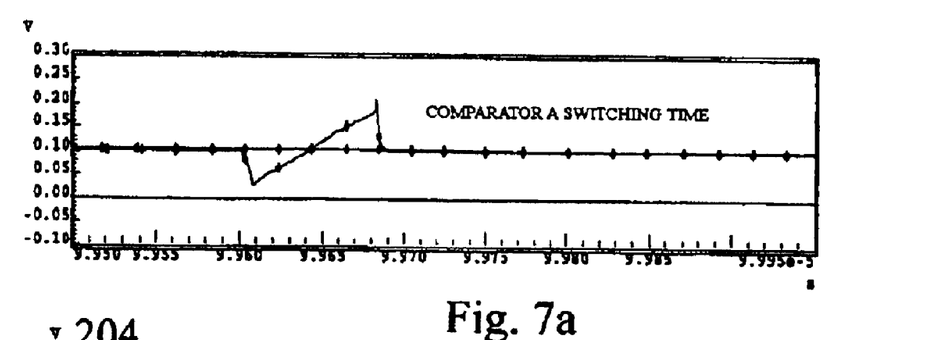
FIGS. 7a to 7d illustrate details of the timing diagrams of FIGS. 6a to 6e.

FIG. 7a illustrates the input signal of the comparator 109, in detail.

Figure 7B:
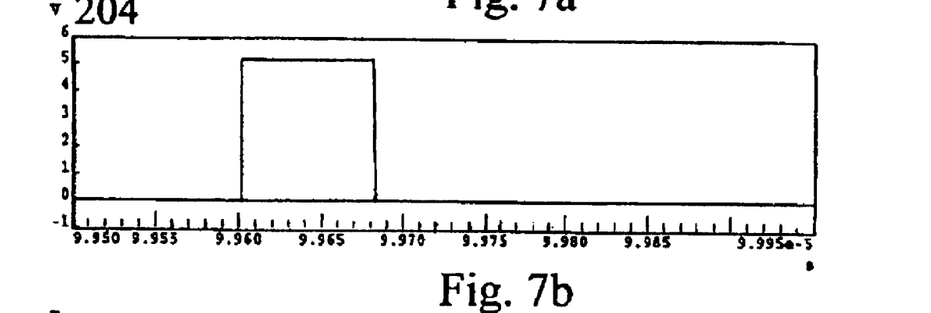

FIG. 7b illustrates the output signal Q 204 of the second toggling circuit in detail, which controls the resetting of the ramp generator circuit.

Figure 7C:
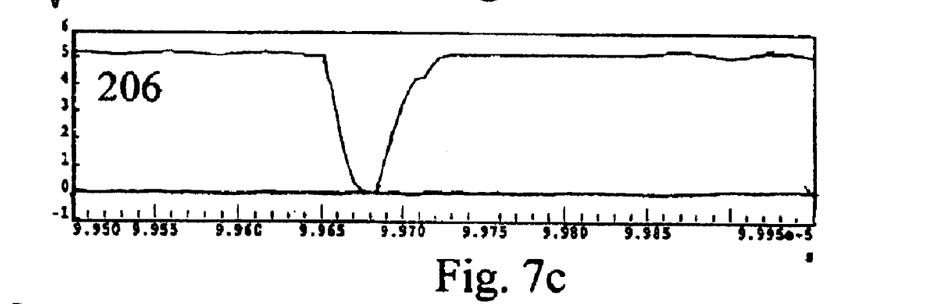

FIG. 7c illustrates in detail the output voltage 206 of the AND gate 201, which is used to control the setting to conduction of power transistor 101.

Figure 7D:
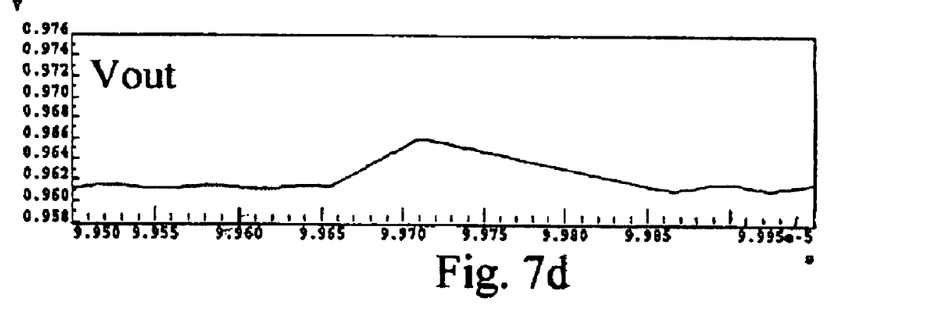

FIG. 7d shows details of the voltage Vout on terminals of the load.

Comparing FIGS. 5c and 7c, it can be particularly noted that desynchronization allows to substantially reduce duration of the setting to conduction of the power transistor, and without using a faster comparator 109.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A switched mode power supply device comprising:
    a power transistor configured to be periodically set to conduction according to a cyclic ratio and to supply a load;
    a ramp generation circuit coupled to a clock signal generator to periodically generate a ramp voltage having a starting point;
    an amplifier error circuit configured to generate an error voltage representative of a difference between a reference voltage and said regulated voltage;
    a comparator configured to generate a comparison of the ramp voltage generated by said ramp generation circuit with said error voltage to provide an output signal based on the comparison for controlling said power transistor; and
    a desynchronization circuit having an input coupled to an output of the comparator; a first output coupled to a control terminal of the power transistor, a second output coupled to a control input of the ramp generation circuit, a first leg coupled between the input and the first output, and a second leg coupled between the input and the second output, the first leg including a delay element configured to delay the setting to conduction of the power transistor so as to desynchronize the starting point of the ramp voltage and said setting to conduction.

2. The switched mode power supply device according to claim 1 wherein said comparator is connected to an input of a toggling circuit and is then disabled upon completion of the comparison.

3. The switched mode power supply device according to claim 1 wherein:
    the amplifier error circuit includes a first operational amplifier, having a positive input that receives the reference voltage, and assembled as a linear amplifier for generating the error signal representative of the difference between the regulated voltage and the reference voltage, said first operational amplifier having a feedback loop comprised of a resistor and a capacitor assembled in parallel,
    the ramp generation circuit has a reset input for generating a ramp voltage upon detection of a reset signal; and
    the comparator includes a second operational amplifier assembled to receive said error signal generated by an output of said first operational amplifier to a first input, and to receive an output voltage generated by said ramp generation circuit to a second input;
    the switched mode power supply device further comprising: a D toggling circuit receiving an output voltage of said second operational amplifier as an input; and
    a reversing switch having an input connected to said D toggling circuit output, said reversing switch having an output connected to the reset input of said ramp generation circuit; and wherein:
    the delay element has an input connected to said reversing switch output and has an output used to control said power transistor, said delay element configured to introduce a preset delay to set conduction of said power transistor.

4. The switched mode power supply device of claim 1 wherein the desyncronization circuit further includes a logic circuit having a first input coupled to the first leg, a second input coupled to the second leg, and an output coupled to the control terminal of the power transistor.

5. The switched mode power supply device of claim 4 wherein the desyncronization circuit further includes a toggle circuit having a first input coupled to the clock signal generator, a second input coupled to the output of the comparator, and an output coupled to the delay element.

6. The switched mode power supply device of claim 4 wherein the first leg includes a first toggle circuit having a first input coupled to the clock signal generator, a second input coupled to the output of the comparator, and an output coupled to the delay element; and the second leg includes a second toggle circuit having a first input coupled to the clock signal generator, a second input coupled to the output of the comparator, and an output coupled to the logic circuit and the control input of the ramp generation circuit.

7. The switched mode power supply device of claim 4 wherein the logic circuit includes an AND gate.

8. A switched mode power supply device comprising:
    a power transistor configured to be periodically set to conduction according to a cyclic ratio and to supply a load;
    a ramp generation circuit coupled to a clock signal generator to periodically generate a ramp voltage having a starting point;
    an amplifier error circuit configured to generate an error voltage representative of a difference between a reference voltage and said regulated voltage;
    a comparator configured to generate a comparison of the ramp voltage generated by said ramp generation circuit with said error voltage to provide an output signal based on the comparison for controlling said power transistor;

a delay element configured to delay the setting to conduction of the power transistor so as to desynchronize the starting point of the ramp voltage and said setting to conduction; and a desynchronization circuit coupled between the ramp generation circuit and the power transistor, said desynchronization circuit including:

a first toggling circuit having an input connected to a reference voltage and an output, said first toggling circuit being controlled by a clock signal;

a second toggling circuit having an input, connected to the reference voltage, and an output, said second toggling circuit being controlled by the clock signal; said output of the second toggling circuit being connected so as to control the start of said ramp generation circuit;

wherein the delay element has an input connected to the output of said first toggling circuit, and has an output; and an AND gate having a first input connected to the output of said delay element, and a second input connected to the output of said second toggling circuit, and having an output for controlling said power transistor;

said first and second toggling circuits being connected to said comparator so that switching of the comparator causes resetting of said first and second toggling circuits so as to control switch-off of said power transistor.

9. The switched mode power supply device according to claim 8 wherein the ramp generation circuit includes a power source coupled to a capacitor, the power source configured to charge the capacitor, and a MOS transistor coupled to said capacitor and configured to discharge said capacitor.

10. A cellular phone comprising:

a power transistor configured to be periodically set to conduction according to a cyclic ratio and to supply a load;

a ramp generation circuit coupled to a clock signal generator to periodically generate a ramp voltage having a starting point;

an amplifier error circuit configured to generate an error voltage representative of a difference between a reference voltage and said regulated voltage;

a comparator configured to generate a comparison of the ramp voltage generated by said ramp generation circuit with said error voltage to provide an output signal based on the comparison for controlling said power transistor, and a desynchronization circuit having an input coupled to an output of the comparator; a first output coupled to a control terminal of the power transistor, a second output coupled to a control input of the ramp generation circuit, a first leg coupled between the input and the first output, and a second leg coupled between the input and the second output, the first leg including a delay element configured to delay the setting to conduction of the power transistor so as to desynchronize the starting point of the ramp voltage and said setting to conduction.

11. The cellular phone according to claim 10 wherein said comparator is connected to an input to a toggling circuit and is then disabled upon completion of the comparison.

12. The cellular phone according to claim 10 wherein:

the amplifier error circuit includes a first operational amplifier, having a positive input that receives the reference voltage and assembled as a linear amplifier for generating the error signal representative of the difference between the regulated voltage and the reference voltage, said first operational amplifier having a feedback loop comprised of a resistor and a capacitor assembled in parallel, the ramp generation circuit has a reset input for generating a ramp voltage upon detection of a reset signal; and the comparator includes a second operational amplifier assembled to receive said error signal generated by an output of said first operational amplifier to a first input, and to receive an output voltage generated by said ramp generation circuit to a second input;

the switched mode power supply device further comprising: a D toggling circuit receiving an output voltage of said second operational amplifier as an input; and a reversing switch having an input connected to said D toggling circuit output, said reversing switch having an output connected to the reset input of said ramp generation circuit; and wherein:

the delay element, has one input connected to said reversing switch output and has an output that is used to control said power transistor, said delay element configured to introduce a preset delay to set conduction of said power transistor.

13. The cellular phone of claim 10 wherein the desyncronization circuit further includes a logic circuit having a first input coupled to the first leg, a second input coupled to the second leg, and an output coupled to the control terminal of the power transistor.

14. The cellular phone of claim 13 wherein the desyncronization circuit further includes a toggle circuit having a first input coupled to the clock signal generator, a second input coupled to the output of the comparator, and an output coupled to the delay element.

15. The cellular phone of claim 13 wherein the first leg includes a first toggle circuit having a first input coupled to the clock signal generator, a second input coupled to the output of the comparator, and an output coupled to the delay element; and the second leg includes a second toggle circuit having a first input coupled to the clock signal generator, a second input coupled to the output of the comparator, and an output coupled to the logic circuit and the control input of the ramp generation circuit.

16. The cellular phone of claim 13 wherein the logic circuit includes an AND gate.

17. A cellular phone comprising:

a power transistor configured to be periodically set to conduction according to a cyclic ratio and to supply a load;

a ramp generation circuit coupled to a clock signal generator to periodically generate a ramp voltage having a starting point;

an amplifier error circuit configured to generate an error voltage representative of a difference between a reference voltage and said regulated voltage;

a comparator configured to generate a comparison of the ramp voltage generated by said ramp generation circuit with said error voltage to provide an output signal based on the comparison for controlling said power transistor;

a delay element configured to delay the setting to conduction of the power transistor so as to desynchronize the starting point of the ramp voltage and said setting to conduction; and a desynchronization circuit coupled between the ramp generation circuit and the power transistor, said desynchronization circuit including:

a first toggling circuit having an input connected to a reference voltage and an output, said first toggling circuit being controlled by a clock signal;

a second toggling circuit having an input, connected to the reference voltage, and an output, said second toggling circuit being controlled by the clock signal; said output of the second toggling circuit being connected so as to control the start of said ramp generation circuit;

wherein the delay element has an input connected to the output of said first toggling circuit, and has an output; and an AND gate having a first input connected to the output of said delay element, and a second input connected to the output of said second toggling circuit, and having an output for controlling said power transistor;

said first and second toggling circuits being connected to said comparator so that switching of the comparator causes resetting of said first and second toggling circuits so as to control switch-off of said power transistor.

18. A method comprising:

periodically setting a power transistor to conduction according to a cyclic ratio Ton/T to supply a current and a regulated voltage;

periodically generating a ramp voltage having a starting point;

generating an error voltage representative of a difference between a reference voltage and said regulated voltage;

generating a comparison of the ramp voltage with said error voltage to provide an output signal based on the comparison for controlling the power transistor; and delaying the setting to conduction of the power transistor so as to desynchronize the starting point of the ramp voltage and said setting to conduction by:

creating a first control signal based on a clock signal and using the first control signal to control the generating of the ramp voltage;

creating a second control signal based on the clock signal;

creating a delayed signal that is a delayed version of the second control signal; and creating a third control signal based on a logical combination of the first control signal and the delayed signal, the third control signal being used to periodically set the power transistor to conduction.

19. The method of claim 18 further comprising disabling further capability of generating the comparison for a particular cycle once a comparison has been made for the cycle.

20. A system comprising:

means for periodically setting a power transistor to conduction according to a cyclic ratio Ton/T to supply a current and a regulated voltage;

means for periodically generating a ramp voltage having a starting point;

means for generating an error voltage representative of a difference between a reference voltage and said regulated voltage;

means for generating a comparison of the ramp voltage with said error voltage to provide an output signal based on the comparison for controlling the power transistor; and means for delaying the setting to conduction of the power transistor so as to desynchronize the starting point of the ramp voltage and said setting to conduction, the means for delaying including:

means for creating a first control signal based on a clock signal and using the first control signal to control the generating of the ramp voltage;

means for creating a second control signal based on the clock signal;

means for creating a delayed signal that is a delayed version of the second control signal; and means for creating a third control signal based on a logical combination of the first control signal and the delayed signal, the third control signal being used to periodically set the power transistor to conduction.

21. The system of claim 20 further comprising means for disabling further capability of generating the comparison for a particular cycle once a comparison has been made for the cycle.

22. The system of claim 20 wherein the means for creating the first control signal includes a first toggle circuit connected between the means for generating a comparison and the means for periodically generating a ramp voltage, the means for creating the second control signal includes a second toggle circuit connected between the means for generating a comparison and the means for creating a delayed signal, and the means for creating the third control signal includes an AND gate.

* * * * *